(12) United States Patent
Zhihai et al.

(10) Patent No.: US 6,941,065 B2
(45) Date of Patent: Sep. 6, 2005

(54) CAMERA INTERLOCKS THAT ENSURE PROPER MOVEMENT OF FILM

(75) Inventors: Xu Zhihai, Hangzhou (CN); Feng Huajun, Hangzhou (CN); Li Qi, Hangzhou (CN); Bian Meijuan, Hangzhou (CN)

(73) Assignee: Concord Camera Corp., Hollywood, CA (US)

( * ) Notice: Subject to any disclaimer, the term of this patent is extended or adjusted under 35 U.S.C. 154(b) by 26 days.

(21) Appl. No.: 10/343,419

(22) PCT Filed: Aug. 23, 2001

(86) PCT No.: PCT/US01/26268

§ 371 (c)(1),
(2), (4) Date: May 8, 2003

(87) PCT Pub. No.: WO02/17013

PCT Pub. Date: Feb. 28, 2002

(65) Prior Publication Data

US 2004/0037551 A1 Feb. 26, 2004

(30) Foreign Application Priority Data

Aug. 23, 2000 (CN) .................................... 00248980 U (51) Int. Cl.$^7$ ............................................... G03B 17/02
(52) U.S. Cl. .......................................... 396/6; 396/413
(58) Field of Search ............................ 396/6, 411, 413, 396/443

(56) References Cited

U.S. PATENT DOCUMENTS

| | | | |
|---|---|---|---|
| 2,125,388 A | 8/1938 | Monroe | 95/1.1 |
| 2,307,297 A | 1/1943 | Phillimore | 88/16 |
| 2,571,756 A | 10/1951 | Pribus | 95/59 |
| 2,674,931 A | 4/1954 | Ihalyi | 905/31 |
| 2,989,906 A | 6/1961 | Rentschler | 95/11 |
| 3,014,417 A | 12/1961 | Maiershofer | 95/59 |
| 3,033,093 A | 5/1962 | Stimson et al. | 95/64 |
| 3,096,699 A | 7/1963 | Harvey et al. | 95/31 |
| 3,097,809 A | 7/1963 | Gunther | 242/71.3 |
| 3,282,181 A | 11/1966 | Lange | 95/11 |
| 3,481,261 A | 12/1969 | Fischer et al. | 95/31 |
| 3,491,957 A | 1/1970 | Sawada et al. | 242/71.5 |
| 3,645,189 A | 2/1972 | Rentschler et al. | 95/11.5 R |
| 3,648,588 A | 3/1972 | Alfreddson et al. | 95/53 R |
| 3,665,828 A | 5/1972 | Reiter | 95/11 R |
| 3,707,118 A | 12/1972 | Stoneham et al. | 95/62 |

(Continued)

FOREIGN PATENT DOCUMENTS

| | | |
|---|---|---|
| DE | 949 324 | 9/1956 |
| DE | 30 16 005 A1 | 10/1981 |
| DE | 31 10 518 | 10/1982 |
| DE | 40 09 794 A1 | 6/1990 |
| EP | 0 696 754 A1 | 2/1996 |
| GB | 2 130 387 | 5/1984 |
| JP | 48-46622 | 10/1971 |

*Primary Examiner*—David M. Gray
(74) *Attorney, Agent, or Firm*—Woodcock Washburn LLP (57) ABSTRACT

The camera of this invention has a film cassette compartment, a film spool (13), a film exposing area, and an interlock that prevents moving exposed film from the film cassette. With the camera, a film cassette (2) is loaded into the film cassette compartment. The film is then locaded by moving the film from the film cassette (2) compartment across the film exposing area and winding all but the first frame of film to be exposed around the film spool. After a picture taken, the exposed film is wound back into the film cassette and the next from of film to be exposed is moved into the film exposing area. The interlock prevents moving the exposed film out of the film exposing area. In an embodiment the interlock includes a lever that is engageable with the serrations of a film rewind wheel (22) to prevent movement of the film rewind wheel (22).

28 Claims, 7 Drawing Sheets

U.S. PATENT DOCUMENTS

| | | | | |
|---|---|---|---|---|
| 3,709,127 | A | 1/1973 | Milanese et al. | 93/31 |
| 3,733,485 | A | 5/1973 | Gaynor et al. | 250/65 T |
| 3,733,985 | A | 5/1973 | Gordon | 95/1.1 |
| 3,820,138 | A | 6/1974 | Horton | 354/142 |
| 3,848,895 | A | 11/1974 | Christopher | 280/478 R |
| 3,848,985 | A | 11/1974 | Bennett | 354/41 |
| 4,011,570 | A | 3/1977 | Stievenart et al. | 354/89 |
| 4,017,875 | A | 4/1977 | Yamamichi | 354/209 |
| 4,063,263 | A | 12/1977 | Krewalk, Sr. | 354/253 |
| 4,139,294 | A | 2/1979 | Aneshansley et al. | 354/217 |
| 4,139,295 | A | 2/1979 | Matsumoto | 354/246 |
| 4,201,458 | A | 5/1980 | Viering | 354/136 |
| 4,206,997 | A | 6/1980 | Licciardi | 355/39 |
| 4,268,144 | A | 5/1981 | Wheeler | 354/108 |
| 4,291,962 | A | 9/1981 | Jackson | 354/122 |
| 4,310,232 | A | 1/1982 | Reed | 354/125 |
| 4,332,448 | A | 6/1982 | Zawodny | 354/213 |
| 4,354,753 | A | 10/1982 | Tenne et al. | 354/232 |
| 4,427,279 | A | 1/1984 | Edelstein et al. | 354/107 |
| 4,455,074 | A | 6/1984 | Wong et al. | 354/173.1 |
| 4,527,876 | A | 7/1985 | Tanaka et al. | 354/229 |
| 4,533,224 | A | 8/1985 | Ou | 354/77 |
| 4,655,570 | A | 4/1987 | Jaffe | 354/107 |
| 4,668,067 | A | 5/1987 | Simon et al. | 354/246 |
| 4,685,790 | A | 8/1987 | Uematsu | 354/203 |
| 4,717,930 | A | 1/1988 | Wheeler | 354/108 |
| 4,804,987 | A | 2/1989 | Arai | 354/219 |
| 4,816,848 | A | 3/1989 | Doyle, Jr. | 354/108 |
| 4,855,774 | A | 8/1989 | Ohmura et al. | 354/203 |
| 4,894,671 | A | 1/1990 | Wheeler | 354/108 |
| 4,896,176 | A | 1/1990 | Barrett | 354/122 |
| 4,920,372 | A | 4/1990 | Nakagawa et al. | 354/412 |
| 4,954,857 | A | 9/1990 | Mochida et al. | 354/75 |
| 4,972,649 | A | 11/1990 | Mochida et al. | 53/430 |
| 4,994,832 | A | 2/1991 | Spector | 354/110 |
| 4,994,833 | A | 2/1991 | Cocca | 354/207 |
| 5,000,396 | A | 3/1991 | Barrella | 242/71 |
| 5,034,761 | A | 7/1991 | Jones | 354/129 |
| 5,063,400 | A | 11/1991 | Takei et al. | 354/288 |
| 5,111,224 | A | 5/1992 | Spector | 354/125 |
| 5,119,118 | A | 6/1992 | Harada et al. | 354/106 |
| 5,247,320 | A | 9/1993 | Kay | 354/83 |
| 5,249,008 | A | 9/1993 | Mauchan | 354/108 |
| 5,255,037 | A | 10/1993 | Kobayashi | 354/229 |
| 5,262,808 | A | 11/1993 | Mauchan | 354/108 |
| 5,276,470 | A | 1/1994 | Fridman | 354/106 |
| 5,296,885 | A | 3/1994 | Sangregory et al. | 354/230 |
| 5,331,363 | A | 7/1994 | Fridman | 354/159 |
| 5,339,125 | A | 8/1994 | Fridman et al. | 354/106 |
| 5,361,108 | A | 11/1994 | Kamata et al. | 354/120 |
| 5,394,214 | A | 2/1995 | Petruchik | 354/288 |
| 5,452,036 | A | 9/1995 | Kamata | 354/275 |
| 5,453,808 | A | 9/1995 | Zawodny et al. | 354/212 |
| 5,486,885 | A | 1/1996 | Matsumoto | 354/106 |
| 5,521,665 | A | 5/1996 | Petruchik | 354/149.1 |
| 5,537,176 | A | 7/1996 | Hara et al. | 354/288 |
| 5,552,846 | A | 9/1996 | Tokui | 354/173.1 |
| 5,555,053 | A | 9/1996 | Stephenson, III | 354/206 |
| 5,555,057 | A | 9/1996 | DiRisio | 354/212 |
| 5,576,790 | A | 11/1996 | Lamphron et al. | 396/389 X |
| 5,576,793 | A | 11/1996 | Hara et al. | 396/6 |
| 5,600,395 | A | 2/1997 | Balling et al. | 396/6 |
| 5,602,610 | A | 2/1997 | Akimoto et al. | 396/449 |
| 5,612,758 | A | 3/1997 | Petruchik | 396/413 |
| 5,614,976 | A | 3/1997 | Smart et al. | 396/392 |
| 5,614,977 | A | 3/1997 | Smart | 396/295 |
| 5,629,750 | A | 5/1997 | Smart et al. | 396/538 |
| 5,640,637 | A | 6/1997 | Stephenson, III | 396/411 |
| 5,689,733 | A | 11/1997 | Zawodny et al. | 396/6 |
| 5,708,885 | A | 1/1998 | Nomura et al. | 396/355 |
| 5,717,970 | A | 2/1998 | Bryant et al. | 396/50.2 |
| 5,778,269 | A | 7/1998 | Williams | 396/387 |
| 5,799,220 | A * | 8/1998 | Zander | 396/411 |
| 5,842,067 | A | 11/1998 | Williams | 396/413 X |
| 6,033,127 | A | 3/2000 | Sakurai | 396/413 |
| 6,059,464 | A | 5/2000 | Sakurai | 396/413 |
| 6,226,457 | B1 * | 5/2001 | Boyd et al. | 396/6 |
| 6,278,848 | B1 | 8/2001 | Bittner | 396/389 |
| 6,280,103 | B1 | 8/2001 | Zawodny et al. | 396/515 |
| 6,331,082 | B1 | 12/2001 | Bittner | 396/413 |
| 6,353,714 | B1 | 3/2002 | Zawodny et al. | 396/317 |
| 6,418,278 | B1 | 7/2002 | Bittner | 396/195 |

* cited by examiner

CAMERA INTERLOCKS THAT ENSURE PROPER MOVEMENT OF FILM

CROSS-REFERENCE TO RELATED APPLICATIONS

This application is a filing under 35 U.S.C. section 371, and claims priority to PCT International Application Number PCT/US01/26268, filed on Aug. 23, 2001 and further claims priority under 35 U.S.C. section 119 to Chinese patent application number 00248980.5, filed on Aug. 23, 2000.

FIELD OF THE INVENTION

This invention relates to photographic cameras that have an interlocks which prevent moving film to and from the film cassette when such movement is not desired.

BACKGROUND OF THE INVENTION

Traditionally, a camera user loads film into a photographic camera by inserting a film cassette into a film cassette chamber and moving a small portion of film, the film leader, across the film exposing area to a film spool. The camera is then light sealed and ready for operation. After a picture is taken, the camera user then winds the exposed film around the film spool and moves the next frame of film to be exposed into the film exposing area.

Relatively recently a new method of loading film, preloading or prewinding film, has been developed. Film prewinding includes inserting a film cassette into the film cassette compartment and prewinding the film around the film spool on the opposing side of the camera. After a picture is taken, the exposed film is wound back into the film cassette and the next frame of film is moved to the film exposing area. In contrast to the prior method, after the last frame of film is exposed the film is wound back into the film cassette as opposed to around the film spool. Thus, prewinding avoids having to rewind the film back into the film cassette after the pictures have been taken. One advantage of prewinding is that the exposed film is housed within the light tight film cassette and cannot be accidentally exposed by opening the camera.

One problem that has been created by such cameras is that if the camera has a mechanism for rotating the film spindle of a film cassette and a separate mechanism for rotating a film spool, the camera user may operate one of the mechanisms by mistake and move film in the wrong direction. Another problem that has been created with the new method is the possibility that the camera user may accidentally move previously exposed film from the film cassette to the film exposing area and reexpose the exposed film. Still another problem is that the camera user may not properly prewind the film around the film spool. These problems are particularly acute in manual film cameras including "single use" cameras. The camera of this invention has interlocks that prevent moving film in an unwanted direction.

As used herein the term advance or advance direction refers to movement of film out of or away from the film cassette and the term rewind or rewind direction refers to the movement of film into or towards the film cassette.

SUMMARY OF THE INVENTION

The camera of this invention includes one of two interlocks, either or both an advance interlock or a rewind interlock. The camera has a film cassette compartment, a film spool and a film exposing area disposed between the film cassette compartment and the film spool. The camera has a film rewind wheel that is coupled to a spindle of a film cassette when a film cassette is inserted into the film cassette compartment. Rotation of the rewind wheel by a camera user will rotate the film cassette spindle and move film either into or out of the film cassette. The camera also has a film advance lever coupled to the film spool. Rotation of the film spool by the film advance lever will move film either around the film spool or away from the film spool.

The camera preferably uses 35 mm. film. Preloading film into the camera includes inserting a film cassette into the film cassette compartment, placing the film leader in the film exposing area and around the film spool, and light sealing the camera. Preloading further includes moving the film from the film cassette across the film exposing area and around the film spool by rotating the advance lever. When taking pictures with the camera, the film is exposed, and the rewind wheel is rotated to move the exposed film back into the film cassette. This sequence of taking a picture and rewinding the exposed frame is repeated until all of the film is exposed and rewound back into the film cassette.

The film advance interlock prevents the camera user from mistakenly operating the film rewind wheel in the advance direction or moving film away from the film cassette. This is needed in order to prevent the camera user from improperly attempting to rotate the rewind wheel in the advance direction. Without the film advance interlock, the camera user may rotate the rewind wheel in the advance direction in an attempt to move exposed film out of the film cassette after a picture has been taken. Such improper rotation will move film in the advance direction—out of the film cassette—or not move film at all. Thus, the film advance interlock prevents the camera user from rotating the rewind wheel in the advance direction and thereby fooling himself into thinking that he has moved the exposed film into the film cassette and moved the next frame of film to be exposed into the film exposing area.

The film advance interlock includes the film rewind wheel, a prevention lever, and a control lever. The film rewind wheel has a serrated inner ring and a notch. The ring and the notch rotate with the rewind wheel. The prevention lever is engageble with the film wheel serrations to prevent movement of the rewind wheel in the advance direction. After preloading film and prior to operating the rewind wheel in the rewind direction, the prevention lever is not engaged with the serrations. The control lever is mechanically coupled to the prevention lever and is disposed within the path of the notch. When the rewind wheel is rotated in the rewind direction after a picture is taken, the wheel notch engages the control lever and moves the control lever. As the control lever moves, the control lever moves the prevention lever into engagement with the film wheel serrations. This engagement prevents movement of the film wheel in the advance direction. Thus, the operator is prevented from improperly trying to rotate the rewind wheel in the advance direction and moving exposed film out of the film cassette when the operator intends to rotate the wheel in the rewind direction.

The film advance interlock may also include a spring that couples the control lever to the prevention lever. A protrusion extending from the camera's back door may hold the spring, the control lever, and the prevention lever in their interlock position. Prior to being moved by the control lever, the spring is not disposed behind the protrusion. After the control lever moves, the spring moves so as to be positioned behind the protrusion. This prevents the spring, the control lever, and the prevention lever from returning to their original positions.

The advance interlock is disabled and the control lever spring, and prevention lever are reset by opening the back cover of the camera. After all of the film has been exposed and the back cover is opened to remove the film, the spring is no longer restrained by the protrusion. Thus, the spring, the control lever and the prevention lever return to their original positions. Another spring, a biasing spring, can be used to bias the levers to their original position.

The rewind interlock includes the film rewind wheel, an interlock lever and the back cover. As referenced above, the rewind wheel has a notch that travels in a path as the rewind wheel rotates. The interlock lever is rotatably mounted to the camera so that it can rotate into and out of the notch path. When in the notch path, the interlock lever prevents rotation of the film rewind wheel in the rewind direction. The back cover has a protrusion extending therefrom that moves the interlock lever into the path of the notch when the back cover is closed, thereby preventing movement of the rewind wheel in the rewind direction. Thus, the rewind interlock is set when the back cover of the camera is closed, which is after the film cassette has been inserted and the film leader has been placed around the film spool, but before the film has been preloaded by moving the film from the film cassette to the film spool. This rewind interlock prevents the camera user from improperly attempting to use the rewind wheel in the rewind direction when film is to be preloaded.

The rewind interlock may further include a reset lever. The reset lever is positioned so that when the back door closes a protrusion extending from the backdoor contacts the reset lever and moves the reset lever. As the reset lever moves, the reset lever pushes on the interlock lever to move the interlock lever into the notch path.

The interlock lever may also be coupled to the control lever so that when the interlock lever moves into the notch path it also engages the control lever to prevent movement of the control lever and the prevention lever.

The rewind interlock may be reset during the film preloading operation. In order to reset the rewind interlock, the camera may have a sprocket that is engaged with the film perforations. The sprocket rotates due to movement of the film across the film exposing area. The sprocket is mechanically coupled to a cam. The cam is disposed so that when it rotates, the cam will contact the interlock lever and rotate the interlock lever out of the notch path and thereby disable the rewind interlock. This also enables the advance interlock because the rotation of the interlock lever disengages the interlock lever from the control lever so that the control lever can be moved as described above to set the advance interlock.

In operation, the sprocket is rotated due to the preloading of film—moving film from the film cassette to the film spool—and this rotates the cam. After a preset amount of film, preferably about 6 exposures, has been preloaded the cam contacts the interlock lever to rotate the interlock lever and disable the rewind interlock.

The invention disclosed herein also includes methods of preloading film by using the rewind interlock, and methods of operating the camera with the advance interlock.

Other features of the invention are described below.

DESCRIPTION OF THE PREFERRED EMBODIMENTS

The camera 10 of this invention is preferably of the type that employs 35 mm. film. Although it need not be, the camera 10 is also preferably a manual camera that is either reusable or of the type that is intended for a single use. Such single use cameras are sold with the film preloaded and are intended to be returned to the film developer with the film cassette enclosed within the camera. The film developer then removes the film cassette from the camera. A camera user can, however, remove the film from these so called single use cameras and reload them with film.

Figure 1:
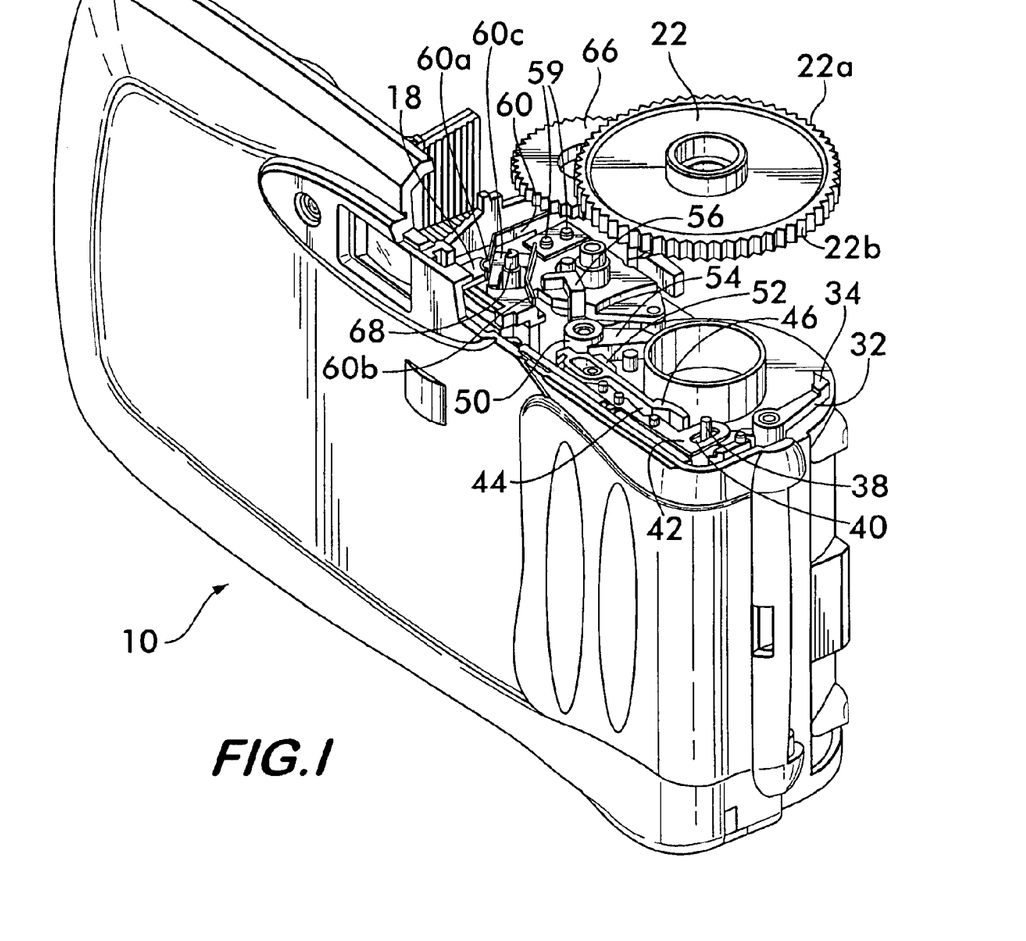
FIG. 1 is a perspective view of a portion of a camera according to a preferred embodiment of this invention with the camera's front cover removed.
Figure 3:
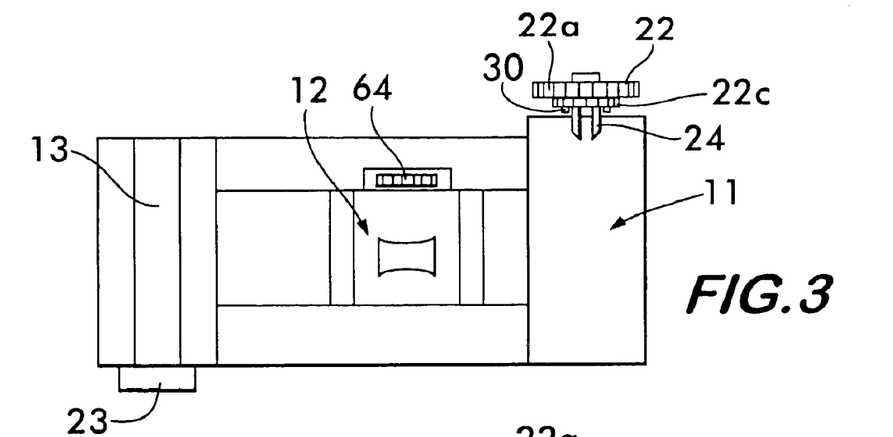
FIG. 3 is schematic drawing of the camera of FIG. 1 depicting the film cassette compartment, the film exposing area and the film spool.
Figure 4:
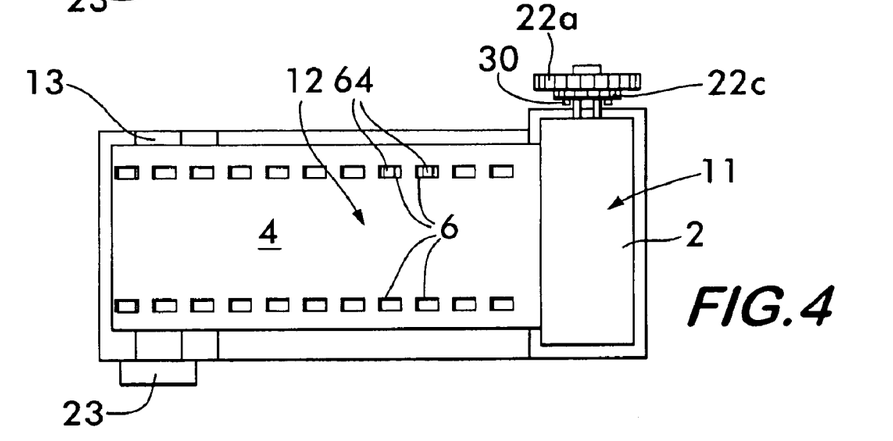
FIG. 4 is a schematic drawing of the camera of FIG. 1 depicting film loaded into the camera.

FIG. 1 depicts a perspective view of a portion of the camera 10 with the front cover and top removed or cut away. The camera 10 of this invention includes a film cassette compartment 11, a film exposing area 12 and a film spool 13, which are shown schematically in FIGS. 3 and 4. FIGS. 3 and 4 are partial schematic depictions of the camera 10 with the back cover 14 removed, and the top portion of the camera cut away. The film spool 13 is disposed on a side of the camera opposite the film cassette compartment 11. The film exposing area 12 is disposed between the film cassette compartment 11 and the film spool 13. FIG. 3 depicts the camera without a film cassette and film. FIG. 4 depicts the camera 10 with a film cassette 2 inserted into the film cassette compartment 11 and film 4 preloaded wrapped around the film spool 13 and disposed in the exposing area 12. FIG. 4 also depicts the film perforations 6.

Figure 2:
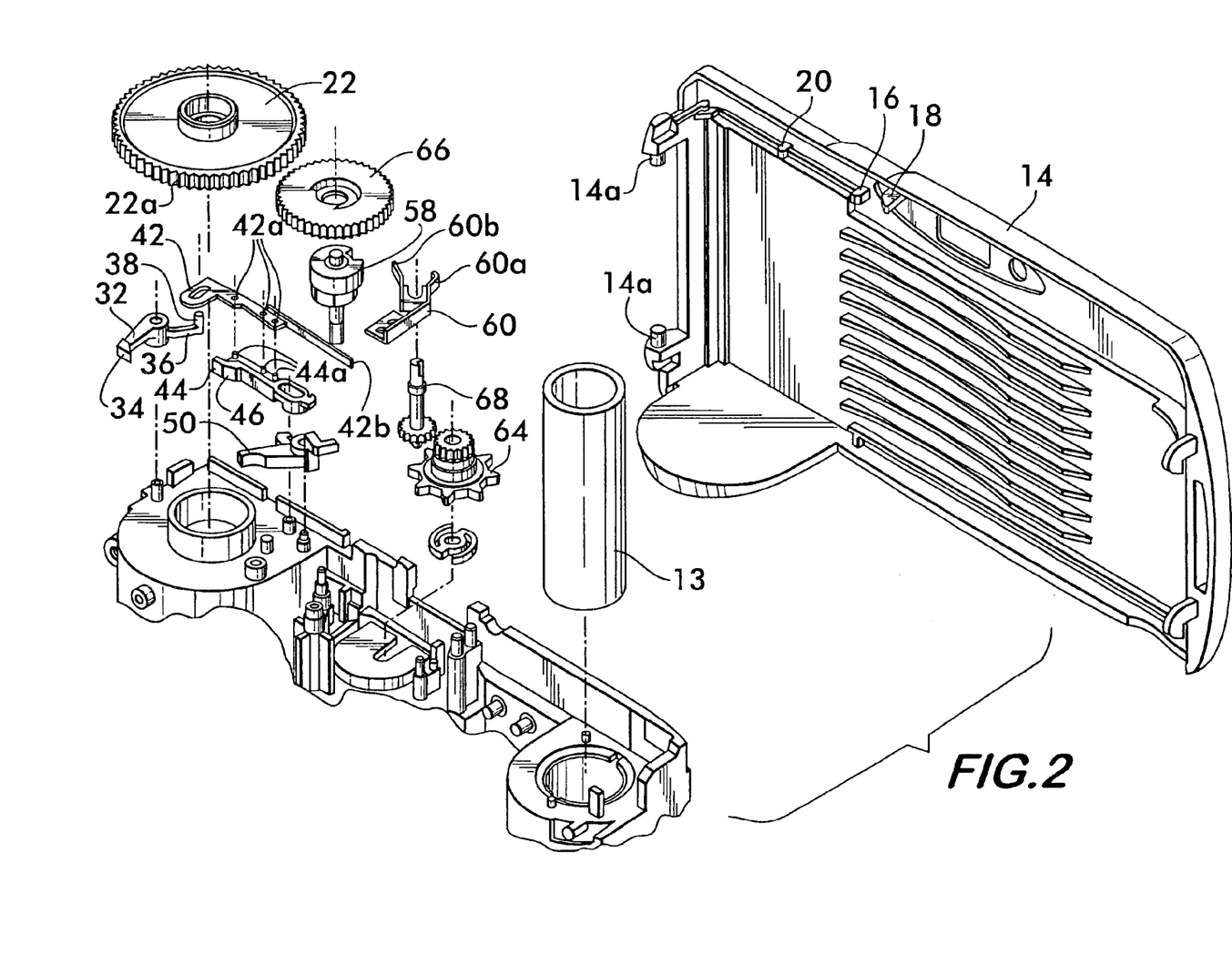
FIG. 2 is an assembly drawing of certain pieces of the camera of FIG. 1.

A back cover 14, which is best shown in FIG. 2, is hinged to the camera 10 as best understood with reference to FIGS. 1, 2, 6 and 7, by hinges 14a and covers the film cassette compartment 11, the film exposing area 12 and the film spool 13. Extending from the back cover 14 are a plurality of protrusions 16, 18, 20. These protrusions 16, 18, 20 cooperate with pieces of the camera 10 to operate various camera levers including control lever 44 and reset lever 60.

Figure 5:
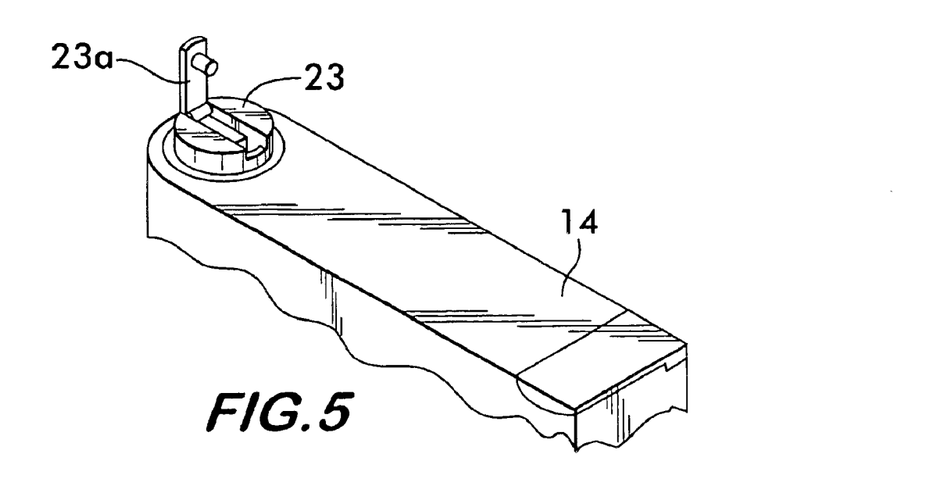
FIG. 5 is a perspective view of the film advance lever on the bottom of the camera of FIG. 1.

In order to move the film, the camera may have a rewind wheel 22, shown in FIGS. 1 and 2, and an advance lever 23, shown in the partial perspective view of FIG. 5. Disposed over the film cassette compartment 11 is the film rewind wheel 22, which is preferably a thumb wheel. The rewind wheel 22 has a spindle 24 that extends into the film cassette compartment 11 as shown in FIG. 3. When inserted into the film cassette compartment 11, the film cassette spindle is coupled to the spindle 24 of the rewind wheel 22. When the camera user rotates the rewind wheel 22 counterclockwise as shown viewed in FIGS. 6–8, the film cassette spindle 24 rotates and the film is pulled into the film cassette.

The film rewind wheel 22 has an outer ring 22a that has a plurality of serrations 22b disposed on its periphery as best shown in FIG. 1. These serrations 22b extend from the film rewind wheel 22 so that a camera user can engage them and rotate the rewind wheel 22 to move film into the film cassette.

Either attached to or formed integrally with the rewind wheel 22 is an inner ring 22c that is preferably of a diameter that is less than the outer ring 22a. This is best shown in the elevation view of FIG. 9. The inner ring 22c rotates with the rewind wheel 22. The inner ring 22c also has serrations 26. As described below, the serrations 26 can be engaged by a camera lever to prevent a camera user from mistakenly rotating the rewind wheel 22 in an undesired direction.

Figure 6:
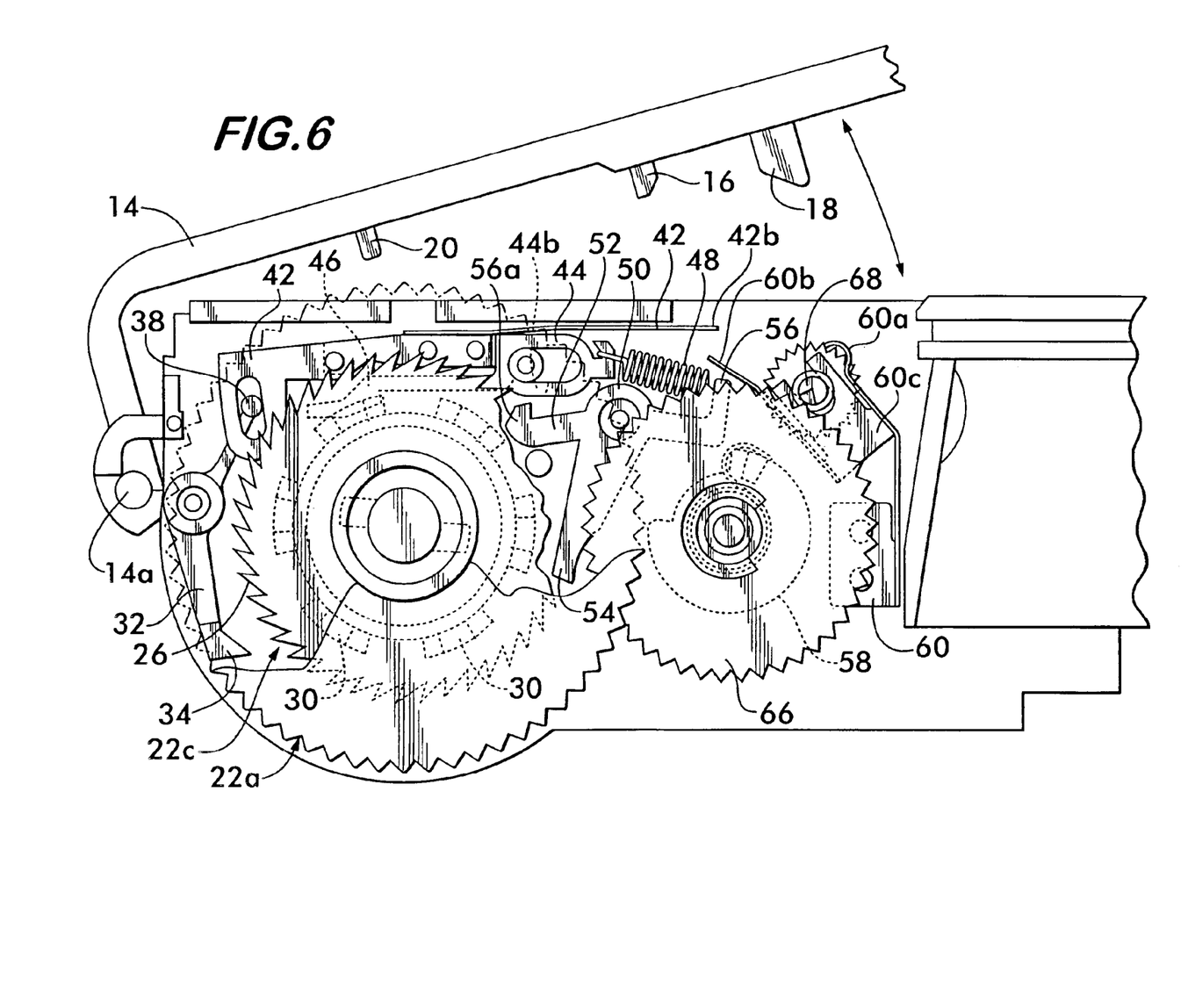
FIG. 6 is a top view wire frame drawing of the camera of FIG. 1 with the back cover open.
Figure 8:
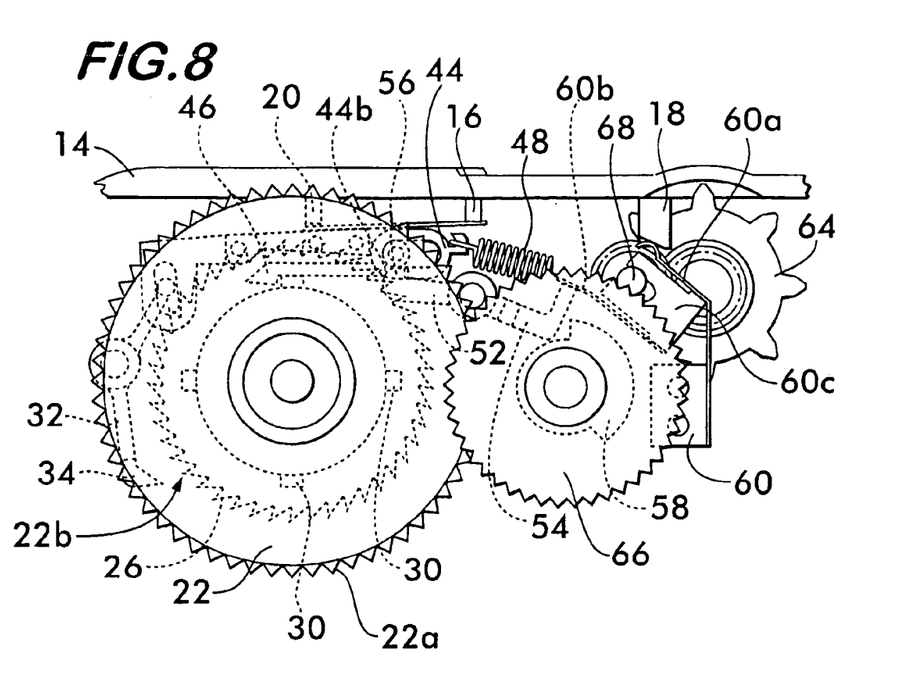
FIG. 8 is a top view of a portion of the camera of FIG. 1 with the back cover closed.
Figure 9:
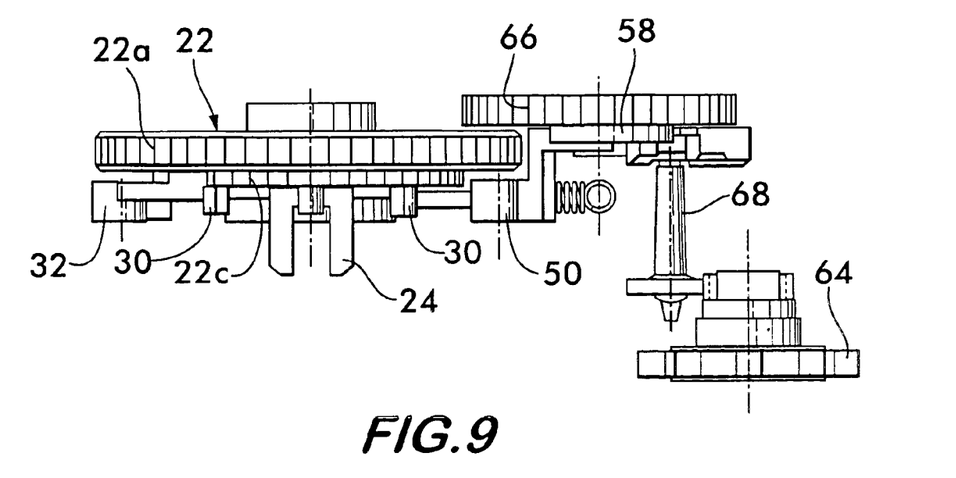
FIG. 9 is an elevation view of a portion of the camera of FIG. 1.

Extending downward from the rewind wheel 22 are a plurality of notches 30 as best shown in FIGS. 8 and 9. The notches 30 can be integrally formed with the rewind wheel 22. The notches 30 are inside of the diameter of the inner ring 22c as shown in FIG. 6. As described in detail below, the notches 30 can be engaged by camera levers to prevent movement of the rewind wheel 22 in an undesired direction.

Disposed on the bottom of the camera and on the opposing side of the camera is the film advance lever 23 as best shown in FIG. 5. The film advance lever 23 is coupled to the film spool 13 so that the rotation of the film advance lever 23 rotates the film spool 13. The advance lever 23 is rotated to pull film 4 from a film cassette 11 and wind film 4 around the film spool 13. The advance lever 23 can be rotated into a dead position in which its rotation does not rotate the film spool 13, and rotated into an active position in which rotation of the advance lever 23 will rotate the film spool 13. This is best understood with reference to FIG. 5. By rotating the arm 23a out of the advance lever 23, the advance lever is activated and its rotation will rotate the film spool 13.

Figure 7:
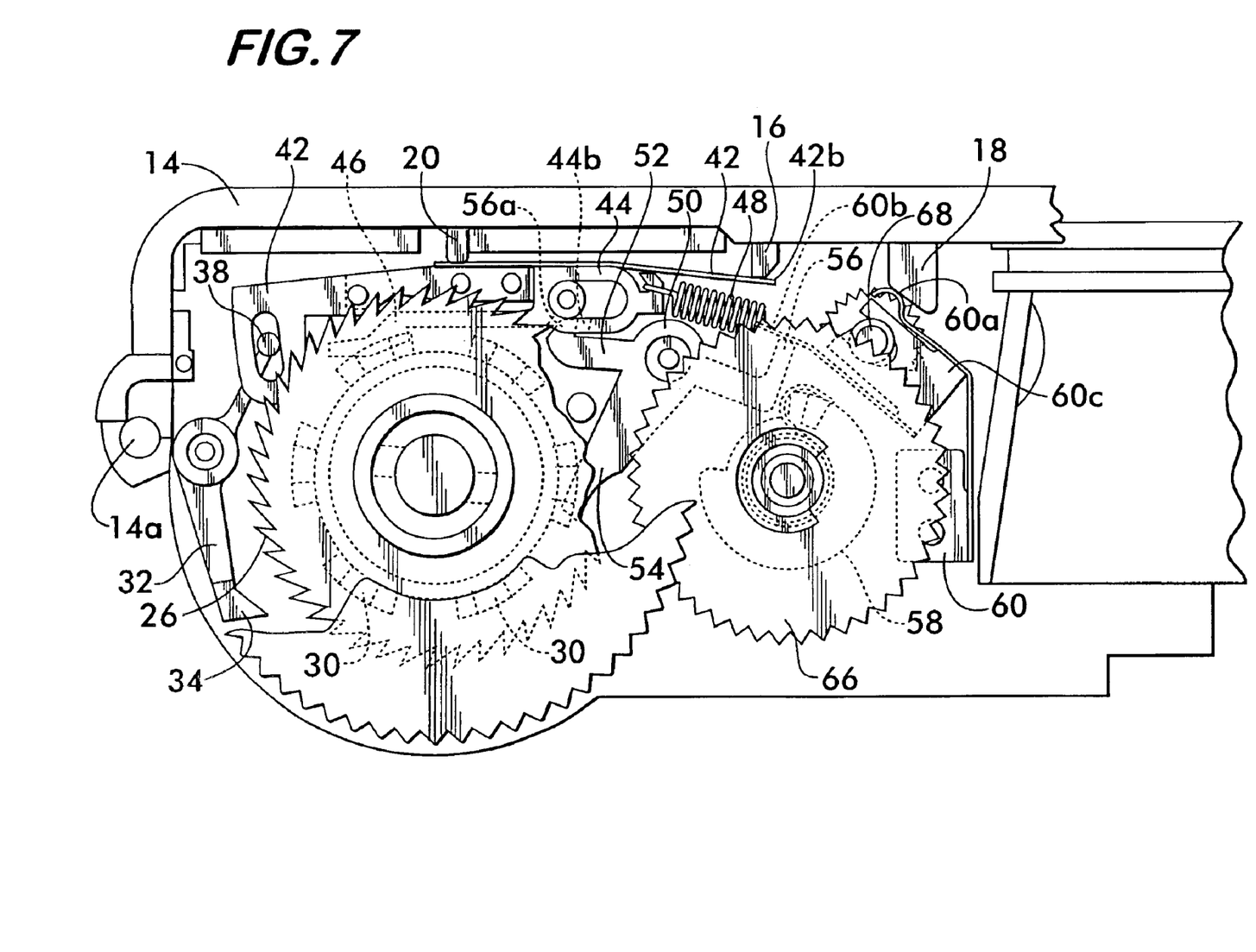
FIG. 7 is a top view wire frame drawing of the camera of FIG. 1 with the back cover closed.

Rotatably mounted to the camera 10 is a film prevention film lever 32 as shown in FIGS. 1 and 6–8. The film prevention lever 32 has a first end 34 that is hooked shaped to interface with the serrations 26 of the rewind wheel 22, as best understood with reference to FIGS. 6–8. The film prevention lever 32 also has a second end 36 from which extends a vertical post 38 as shown in FIG. 2. This post 38 extends into an opening 40 in a spring 42 as shown in FIGS. 6–8. The spring 42 is preferably a leaf spring and is shown in FIGS. 1, 2 and 6–8.

A control lever 44 is slidably mounted to the camera 10 and coupled to the film prevention lever 32 by the spring 42. The spring, 42 is attached to the control lever 44 by posts 44a and holes 42a so that when the control lever 44 slides, the spring 42 slides with the control lever 44. The spring 42 movement rotates the film prevention lever 32 by pushing on the post 38. Through this mechanical connection the control lever 44 controls the movement of the film prevention lever 32 and the engagement of the film prevention lever 32 with the film rewind wheel serrations 26. The control lever 44 has a hooked end 46 for interfacing with the notches 30 of the rewind wheel inner ring 28.

Biasing spring 48 depicted in FIGS. 6–8, is mounted within the camera 10 and attached to the control lever 44. This spring 48 biases the control lever 44 to move to the right as viewed in FIGS. 6–8. In the embodiment shown, the biasing spring 48 is a helical spring.

As referred to above the back cover 14 has a plurality of protrusions 16, 18, 20 that extended inward towards the film. One of these protrusions 16 is disposed proximal to the spring 42 as best understood by reference to FIGS. 6–8. As described below, this protrusion 16 cooperates with the spring 42 to hold the spring 42, the control lever 44, and the prevention lever 32 in place after the control lever 44 has caused the prevention lever 32 to rotate into engagement with the film rewind wheel serrations 26.

Operation of the Film Advance Interlock

The film advance interlock prevents the camera user from mistakenly operating the film rewind wheel 22 in the advance direction or moving film away from the film cassette which is clockwise as viewed in FIGS. 6–8. This is needed in order to prevent the camera user from improperly attempting to rotate the rewind wheel in the advance direction. Without the film advance interlock, the camera user may rotate the rewind wheel clockwise in the advance direction in an attempt to move exposed film into the film cassette. Such improper rotation will move film out of the film cassette in the advance direction or not move film at all. Thus, the film advance interlock prevents the camera user from rotating the rewind wheel 22 in the advance direction and thereby fooling himself into thinking that he has moved the exposed film into the film cassette and moved the next frame of film to be exposed into the film exposing area.

The advance interlock operates as follows. After a film cassette is loaded into the camera's film cassette compartment 11, the film leader can be wound around the film spool 13 and placed in the film exposing area 12 as shown in FIG. 4. The camera is then light sealed by shutting the back door 14 of the camera. This moves the camera from the door open position of FIG. 6 to the door closed position of FIGS. 7 and 8. In order to preload the film, the camera user or camera manufacturer places the advance lever 23 in the active position and rotates the advance lever 23 to rotate the film spool 13 and pull film from the film cassette 2 across the film exposing area and around the film spool 13. After the film is completely advanced or prewound, the first frame of film to be disposed in the film exposing area.

After a picture is taken with the camera 10, the camera user rotates the film rewind wheel 22 counterclockwise as viewed in FIGS. 6–8 to rewind the exposed film into the film cassette 2 and move the next frame of film into the film exposing area. As the film rewind wheel 22 is rotated counter clockwise, the notch 30 of the rewind wheel contacts the control lever hook 46 and pushes the control lever 44 against the biasing of the spring 48 toward the left from the position of FIG. 7 to the position of FIG. 7A.

Figure 7A:
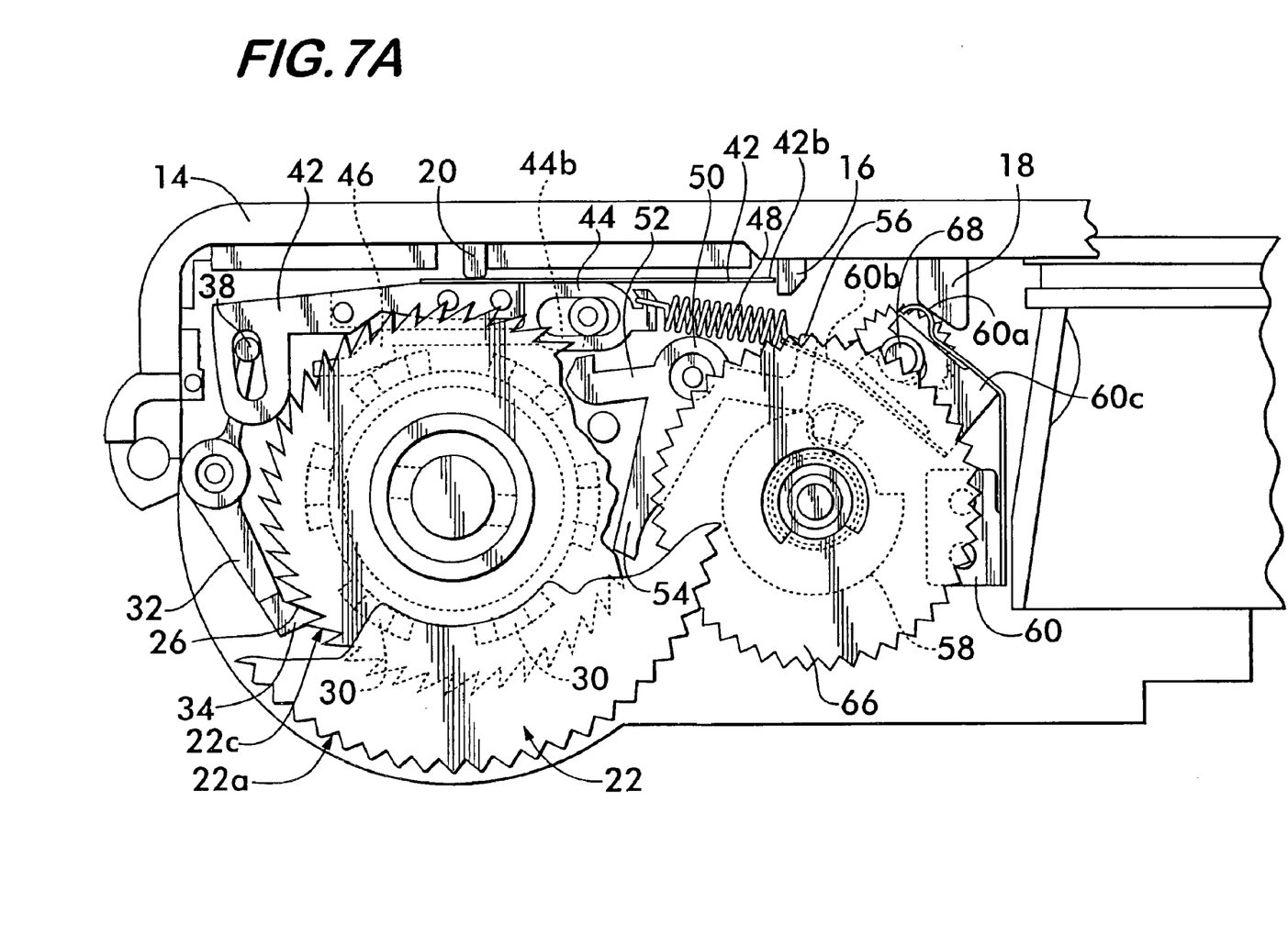
FIG. 7A is a top view wire frame drawing of the camera of FIG. 1 with the back cover closed and the film rewind wheel prevented from rotating in the advance direction.

Because the spring 42 is attached to the control lever 44, the spring 42 also moves to the left with the control lever 44 from the position of FIG. 6 to the position of FIG. 7A. As the spring 42 moves to the left, the spring 42 pushes on the prevention lever post 38 and rotates the prevention lever 32 counter clockwise as viewed in FIGS. 6, 7, 7A, 8 until its hooked end 34 engages the film wheel serrations 26 as shown in FIG. 7A. This sets the film advance interlock. Once engaged with the film wheel serrations 26, the rewind wheel 26 cannot be rotated clockwise, but it can still be rotated counterclockwise in the rewind direction. This is best understood with reference to FIG. 7A. Thus, film can only be rewound, and the camera user is prevented from mistakenly rotating the rewind wheel 26 in the wrong direction.

Without the interlock, a camera user could take a picture and rotate the rewind wheel in the wrong direction; this would cause either no movement of film or movement of film out of the film cassette—in the wrong direction. The camera user would thus be fooled, due to the rotation of the rewind wheel, into thinking that he/she has moved exposed film into the film cassette and moved the next frame of film to the film exposing area, when in fact there would be no film movement or movement in the opposite direction. If the camera user was so fooled, then the camera user would take another picture and would reexpose the previously exposed frame that has remained stationary in the film exposing area; thus, destroying his/her previous picture.

The prevention lever 32 is held engaged with the film rewind wheel serrations 26 by the spring 42 as shown in FIG. 7A. In particular, when the spring 42 slides to the left due to the movement of the control lever 44, (as best understood by comparing FIGS. 7 and 7A) the end 42b of the spring 42 slips behind the back cover protrusion 16 or to the left of the protrusion 16 as shown in FIG. 7A. This protrusion 16 prevents the spring 42 and therefore the attached control lever 44 from sliding back to the right. This also prevents the prevention lever 32 from rotating clockwise and disengaging from the film wheel serrations 26.

In order to reset the advance interlock, the back cover 14 is opened or removed. When the back cover 14 is opened, the protrusion 16 no longer restrains movement of the spring 42 to the right, and the spring 42 and the control lever 44 slide to the right due to the bias of the biasing spring 48 back to the positions shown in FIG. 6. When they move to the right, the prevention lever 32 rotates clockwise back to the position of FIG. 6 and disengages from the rewind wheel serrations 26. Because the back cover 14 is only normally removed after exposing the film, rewinding the film and light sealing the film in the film cassette, the opening of the back cover 14 and resetting of the advance interlock is performed after the film has been exposed and either was, is being or is ready to be removed for the camera.

Rewind Interlock

Rotatably mounted to the camera is an interlock lever 50, as shown in FIGS. 1 and 6–8. The interlock lever 50 preferably has three arms 52, 54, 56. The first arm 52 engages the control lever 44, the second arm 54 engages an inner ring notch 30, and the third arm 56 engages both a cam 58 and a reset lever 60.

The reset lever 60 is mounted to the camera 10 as shown in FIG. 1 by two studs 59 or rivets. The reset lever 60 has a first arm 60a that can be engaged by the back cover protrusion 18 when the back cover 14 is closed. The reset lever 60 has a second arm 60b that engages the interlock lever third arm 56. The reset lever 60 also has a flat portion 60c through which a driving gear 68 described below extends. As shown in FIG. 1, the first arm 60a, the flat portion 60c and the second arm 60b are on a bent portion of the reset lever 60. The reset lever 60 is metal and is biased to rotate counterclockwise as viewed in FIG. 1.

When the back cover 14 is closed, the protrusion 18 pushes against the first reset arm 60a and rotates the reset lever 60. The reset lever rotates and the second arm 60b contacts the third arm 60b of the interlock lever 50 to rotate the interlock lever 50 into the path of the inner ring notch 30 so that rotation of the rewind wheel 22 in the counterclockwise or rewind direction is prevented.

Also rotatably mounted to the camera is a sprocket 64 as shown in FIG. 8. The sprocket 64 has teeth that extend into the film path and through perforations in the film as shown in FIG. 4. Thus, as the film moves along the film path, the sprocket 64 is driven to rotate clockwise as the film moves in the advance direction and counterclockwise as the film moves in the rewind direction.

Also rotatably mounted to the camera 10 are a counting wheel 66, a driving gear 68 and the cam 58. The driving gear 68 is coupled to the sprocket 64 as shown in FIG. 9, so as the sprocket 64 rotates the driving gear 68 is driven to rotate. The top of the driving gear 68 is engaged with the counting wheel 66, so that as the driving gear 68 rotates the counting wheel 66 rotates. This engagement occurs when the reset lever 60 rotates due to the pushing of protrusion 18. When the back cover 14 is open, the driving gear is not engaged with the counting wheel 66 as shown in FIG. 6. After the door is closed the driving gear 68 is pushed by the reset lever 60 into engagement with the counting wheel 66 as shown in FIG. 7. The sprocket 64, driving gear 68 and counting wheel 66 accomplish the counting or metering of the film. The counting wheel is spring biased to a zero position by a helical spring disposed about its shaft and against a collar on the bottom side of the wheel, so that when the wheel is not engaged with the driving gear—when the back door is open to remove film—the wheel returns to the zero position. Also mounted on the same shaft as the counting wheel 66 is the cam 58. Thus, the cam 58 rotates with the counting wheel 66 in response to rotation of the sprocket 64 driving the driving gear 68. The cam 58 also rotates in response to the counter wheel spring when the backdoor is open.

Operation of the Rewind Interlock

The function of the rewind interlock is to prevent rotating the rewind wheel in the rewind direction during film preloading. The rewind interlock prevents rotation of the rewind wheel. Without the rewind interlock, a camera user could improperly rotate the rewind wheel in the counter clockwise or rewind direction when it is desired to preload film and advance film to the film spool. This improper rotation would not move the film from the film cassette, and the camera user could be fooled into thinking that he had preloaded the film. With the rewind interlock, the camera user will know that due to the inability to rotate the rewind wheel in the rewind direction that rotation of the rewind wheel in the rewind direction is not the proper way to load film.

The operation of the rewind interlock is as follows. Before film has been advanced from the film cartridge and when the back cover 14 is open, the interlock lever 50 is rotated clockwise so that the second arm 54 is out of the path of the inner ring notch 30 and the first aim 52 is disengaged from the control lever 44 as shown in FIG. 6. After the film cassette is loaded, the back cover 14 is shut and the protrusion 18 engages the first arm 60a of the reset lever 60 as shown in FIG. 7. This causes the reset lever 60 to rotate clockwise and the second arm 60b of the reset lever 60 to push on the third arm 56 of the interlock lever 50. This rotates the interlock lever 50 clockwise from the position of FIG. 6 to the position of FIG. 7. When rotated clockwise, the second arm 54 of the interlock lever 50 rotates into the path of the rewind wheel notch 30, and the first arm 52 rotates into engagement with the control lever 44. The hooked end 56a of the third arm 56 rotates into the cavity 44b in the control lever 44.

Because the second aim 54 is in the notch path, the rewind wheel 22 cannot be rotated counter clockwise or in the film advance direction. This is the rewind interlock. If the rewind wheel 22 is rotated in the counterclockwise direction, the notch 30 will contact the second arm 54 and be prevented from further rotation.

The rewind interlock 50 prevents the camera operator from moving the rewind wheel 22 in the counter clockwise or rewind direction when the film needs to be advanced from the film cassette and preloaded around the film spool. Thus, the operator is prevented from inserting a film cassette and mistakenly manipulating the rewind wheel in the rewind direction. Without the interlock, a camera user could load a film cassette and then rotate the rewind wheel in the advance direction thinking that this will preload the film. Thus, without the interlock the operator could mistakenly rotate the rewind wheel 26 in the rewind direction, not preload the film, and mistakenly believe that he/she has preloaded film.

In order to properly preload the film, the camera user places the film cassette in the film cassette compartment, places the film leader around the film spool and in the film exposing area as shown in FIG. 4. The back door 14 is shut to enable the rewind interlock as described above. The camera user then places the film advance lever 23 in the active position and rotates the advance lever 23. This rotates the film spool 13 and pulls the film from the film cassette 11 across the film exposing area and around the film spool 13. The camera user does so until all of the film is preloaded around the film spool.

As the camera operator manipulates the film advance lever 23 in the advance direction and the film is pulled from the cassette and across the film exposing area, the sprocket teeth engage the film perforations as shown in FIG. 4. This film movement in the advance direction rotates the sprocket 64 clockwise. The sprocket 64 in turn rotates the driving gear 68 counterclockwise which rotates the counting wheel 66 and the cam 58 in the clockwise direction. The cam 58 is set so that after a sufficient amount of film has been advanced, in a preferred embodiment about six frames, the cam 58 will have rotated sufficiently to engage the third arm 56 of the interlock lever 50 as shown in FIG. 7A.

As the cam 58 engages the interlock lever 50, the cam 58 rotates the interlock lever 50 counter clockwise. The second arm 54 of the interlock lever 50 thus rotates out of the notch path and the first arm 52 disengages from the control lever 44. This defeats the rewind interlock; the camera user is free to rotate the rewind wheel 22 in the rewind direction and move film back inside of the film cassette. Further, the advance interlock can be set because the control lever 44 is now free to move to the left with the first arm 52 rotated out of engagement with the control lever 44. Prior to this, the engagement of the interlock lever 50 and the control lever 44 prevented the control lever 44 from moving to the left.

In order to reset the advance interlock, the back door 14 is opened after all of the film exposures have been taken and the film is rewound into the cassette. When the back door 14 is opened, the reset lever 60 is no longer held by protrusion 18 and rotates clockwise as viewed in FIG. 7A. The driving gear 68 is released by the rotation of the reset lever 60 and moves out of engagement with the counting wheel 66 as shown in FIG. 6. The spring biased counting wheel rotates to its zero position, counterclockwise as viewed in FIG. 7A. The cam 58 rotates with the counting wheel 66 to the position of FIG. 6 and the interlock lever 50 is free to rotate again upon the shutting of the camera door because the cam 58 has rotated out of the interlock lever's path.

SUMMARY

What has been described are two camera interlocks, an advance interlock and a rewind interlock. Before the camera back door 14 is closed, the rewind wheel 22 can rotate in either direction. When the back door 14 is closed after loading a film cassette and a film leader, the interlock lever prevents rotation of the rewind wheel in the rewind direction. After a sufficient amount of film has been preloaded, this rewind interlock is defeated. Upon rewinding film into the film cassette, the prevention lever engages the rewind wheel 22 to create the advance interlock prevent clockwise rotation of the rewind wheel 22. After the back door 14 is open, this advance interlock is defeated.

The rewind interlock prevents a camera user from operating the camera in the rewind direction when the film needs to be advanced or preloaded, and the rewind interlock prevents a camera user from operating the camera in the advance direction after the film has been exposed. These interlocks can be used together or separately. Further, they can be used in various types of cameras, but they are preferably used in manual 35 mm. cameras of either the reusable or single use type.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A camera of the type that has a film cassette compartment for receiving a film cassette, a film spool around which film can be wound and a film exposing area disposed between the film cassette compartment and the film spool, comprising:

a film rewind wheel that is rotatably mounted to the camera and that can rotate in a direction to move film from the film spool to the film cassette, the wheel comprising a serrated ring and a notch;

a prevent lever rotatably mounted to the camera and having an end for engagement with the film rewind wheel ring serrations;

a spring coupled to the prevent lever; and a lever that is slidably mounted to the camera and is coupled to the spring and that has a hook for engagement with the film rewind wheel inner ring notch, so that when the film rewind wheel is rotated in the rewind direction, the notch engages the lever hook and pushes the lever and the spring in a first direction; the movement of the spring causing the prevent lever to rotate so that the prevent lever end engages the rewind wheel serrations to prevent rotation of the rewind wheel in the direction that opposes the film rewind direction and that moves film out of the film cassette.

2. The camera of claim 1, further comprising a back cover that has an inwardly extending protrusion, the protrusion being positioned so that when the spring moves an end of the spring moves against the protrusion and the protrusion prevents the spring and the lever from moving in a direction that opposes the first direction.

3. The camera of claim 1, wherein the camera is of the type that employs 35 mm film.

4. The camera of claim 1, wherein the prevent lever is coupled to the spring by a post extending from the prevent lever into an opening in the spring.

5. The camera of claim 1, further comprising an interlock lever that is rotatably mounted to the camera and that engages the notch to prevent movement of the rewind wheel in the rewind direction until film is moved from the film cassette to the film spool.

6. The camera of claim 5, further comprising:
a sprocket rotatably mounted to the camera and having teeth for engaging film perforations; and
a cam that is rotatably mounted to the camera, the cam engaging the interlock lever when the cam rotates, whereby when the film is advanced from the film cassette, the movement of the film rotates the sprocket, which causes the cam to rotate, the cam contacting the interlock lever during its rotation to push the interlock lever out of engagement with the notch and thereby permit rotation of the rewind wheel in the rewind direction.

7. The camera of claim 6, further comprising a counting wheel that is rotatably mounted to the camera and that is coupled to the sprocket so that rotation of the sprocket causes rotation of the counting wheel.

8. The camera of claim 6, further comprising a rotatable member and a back cover having a protrusion extending inwardly, such that when the back cover is shut, the back cover contacts the rotatable member and causes the rotatable member to rotate and contact the interlock lever and rotate the interlock lever into engagement with the film rewind wheel notch.

9. A camera of the type that has a film cassette compartment for receiving a film cassette, a film spool around which film can be wound and a film exposing area disposed between the film cassette compartment and the film spool, comprising:
a film rewind wheel that is rotatable in a first and a second direction and that has a serrated inner ring and a notch;
a first lever that is engageble with the film wheel serrations to prevent movement of the rewind wheel in the first direction; and
a second lever that is mechanically coupled to the first lever and that is engageable by the notch when the inner ring rotates so that when the rewind wheel is rotated in the second direction the notch engages and moves the second lever, the movement of the second lever moving the first lever into engagement with the film wheel serrations to thereby prevent movement of the film wheel in the first direction.

10. The camera of claim 9, further comprising a spring that mechanically couples the second lever to the first lever.

11. The camera of claim 10, wherein the spring comprises an eye and the second lever comprises a post disposed within the eye.

12. The camera of claim 11, wherein the second direction is a film rewind direction such that film is rewound into the cassette when the wheel is rotated in the second direction.

13. The camera of claim 10, further comprising a back cover that has an inwardly extending protrusion, the protrusion being positioned so that when the spring moves an end of the spring moves against the protrusion and the protrusion prevents the spring and the second lever from moving in a direction that opposes the first direction.

14. The camera of claim 9, further comprising a third lever that is rotatably mounted to the camera and that engages the notch to prevent movement of the rewind wheel in the first direction until film is thrust from the film cassette.

15. The camera of claim 14, further comprising:
a sprocket rotatably mounted to the camera and having teeth for engaging film perforations;
a cam that is rotatably mounted to the camera and that engages the third lever when the cam rotates, whereby when the film is advanced from the film cassette, the movement of the film rotates the sprocket, which causes the cam to rotate, the cam contacting the third lever during its rotation to push the third lever out of engagement with the notch and thereby permit rotation of the rewind wheel in the first direction.

16. The camera of claim 15, further comprising a counting wheel that is rotatably mounted to the camera and that is coupled to the sprocket so that rotation of the sprocket causes rotation of the counting wheel.

17. The camera of claim 16, further comprising a rotatable member and a back cover, such that when the back cover is shut, the back cover causes the rotatable member to rotate into engagement with the film rewind wheel notch.

18. A camera of the type that has a film cassette compartment for receiving a film cassette, a film spool around which film can be wound and a film exposing area disposed between the film cassette compartment and the film spool, comprising:
a film rewind wheel that is rotatable in a first and a second direction and that has a serrated inner ring and a notch, the notch traveling in a path when the rewind wheel rotates;
an interlock lever that is rotatably mounted to the camera and that is engageable with the notch to prevent rotation of the film rewind wheel in the second direction; and
a back cover that has a protrusion extending therefrom, the back cover protrusion causing the interlock lever to move into the path of the notch when the back cover is closed and thereby preventing movement of the rewind wheel in the rewind direction.

19. The camera of claim 18, further comprising an advance lever that is coupled to the film spool and that can be rotated to rotate the film spool and thereby move film from the film cassette to the film spool.

20. The camera of claim 19, further comprising a rotatable cam that is mechanically coupled to rotate upon moving film from the film cassette to the film spool so that when the rewind wheel is rotated in the first direction the cam contacts the interlock lever and rotates the interlock lever to disengage the interlock lever from the notch and thereby permit rotation of the rewind wheel in the second direction.

21. The camera of claim 20, further comprising a sprocket that is rotatably mounted to the camera and that has teeth for engaging film perforations, so that movement of the film pushes the teeth to cause the sprocket to rotate and wherein the sprocket is coupled to the cam so that rotation of the sprocket drives the cam to rotate.

22. The camera of claim 21, further comprising a counting wheel that is rotatably mounted to the camera and that is coupled to the sprocket so that the sprocket drives the counting wheel to rotate.

23. The camera of claim 18, further comprising:
a first lever that is engageble with the film wheel serrations to prevent movement of the rewind wheel in the first direction; and
a second lever that is mechanically coupled to the first lever and that is engageable by the notch when the inner ring rotates so that when the rewind wheel is rotated in the second direction the notch engages and moves the second lever, the movement of the second lever moving the first lever into engagement with the film wheel serrations and thereby prevent movement of the film wheel in the first direction.

24. The camera of claim 23, further comprising a spring that mechanically couples the second lever to the first lever.

25. A method of loading film into a camera of the type that has a film cassette compartment for receiving a film cassette, a film spool and a film exposing area disposed between the film cassette compartment and the film spool, comprising:

winding a film leader extending from a film cassette around a film spool and placing a remaining portion of the film leader in the film exposing area; and closing the back cover of the camera and thereby engaging a protrusion extending from the back cover with a first lever and pushing the first lever to rotate and drive a second lever to rotate into a path of a notch of a film rewind wheel, which prevents rotating the film rewind wheel in a direction that moves film towards the film cassette.

26. The method of claim 25, further comprising rotating a film advance lever that is coupled to the film spool to rotate the film spool and wind the film around the film spool and thereby preload the camera.

27. The method of claim 26, wherein the movement of the film due to the rotation of the film advance lever rotates a sprocket that extends into the film perforations and the rotation of the sprocket rotates the second lever out of the notch path so that the rewind wheel can be rotated in the rewind direction.

28. A method of operating a camera of the type that has a film cassette compartment for receiving a film cassette, a film spool and a film exposing area disposed between the film cassette compartment and the film spool, comprising:

preloading the camera with film by winding the film around the film spool; taking a picture with the camera by exposing a frame of film in the film exposing area; and rotating a film rewind wheel that is coupled to a spindle of a film cassette disposed in the film cassette compartment in a rewind direction to move the frame of film into the film cassette, the film rewind wheel contacting a first lever as the wheel rotates to push the first lever, the movement of the first lever moving a second lever into engagement with serrations of the film rewind wheel to prevent rotating the film rewind wheel in a direction that opposes the rewind direction and thereby preventing a camera user from rotating the film rewind wheel in the direction that opposes the rewind direction and moving film out of the film cassette.

* * * * *

UNITED STATES PATENT AND TRADEMARK OFFICE
CERTIFICATE OF CORRECTION

PATENT NO. : 6,941,065 B2
DATED : September 6, 2005
INVENTOR(S) : Xu Zhihai et al.

It is certified that error appears in the above-identified patent and that said Letters Patent is hereby corrected as shown below:

Column 10,
Line 33, "a direction to move film" should read -- a rewind direction to move film --.

Signed and Sealed this

Thirteenth Day of December, 2005

JON W. DUDAS
*Director of the United States Patent and Trademark Office*